United States Patent [19]
Uesugi

[11] 4,272,160
[45] Jun. 9, 1981

[54] SHOCK ABSORBENT SHIFTING DEVICE

[75] Inventor: Kyozo Uesugi, Sakai, Japan

[73] Assignee: Minolta Camera Kabushiki Kaisha, Osaka, Japan

[21] Appl. No.: 892,052

[22] Filed: Mar. 31, 1978

[30] Foreign Application Priority Data

Apr. 8, 1977 [JP] Japan ................. 52-39446

[51] Int. Cl.³ .................. G02B 7/04; G02B 15/14
[52] U.S. Cl. ................... 350/429; 350/255; 350/430
[58] Field of Search ............ 350/186, 187, 255; 74/569; 354/195, 196

[56] References Cited

U.S. PATENT DOCUMENTS

| | | | |
|---|---|---|---|
| 2,006,464 | 7/1935 | Laube et al. | 350/255 |
| 3,663,093 | 5/1972 | Iida | 350/187 |
| 3,754,473 | 8/1973 | Massey | 74/569 X |
| 3,889,282 | 6/1975 | Hashimoto | 354/196 |
| 3,890,036 | 6/1975 | Grey | 350/187 X |
| 3,897,998 | 8/1975 | Someya et al. | 350/187 |
| 4,045,128 | 8/1977 | Momiyama | 350/255 X |
| 4,175,831 | 11/1979 | Ito | 350/255 |

*Primary Examiner*—John Gonzales
*Attorney, Agent, or Firm*—Wolder, Gross & Yavner

[57] ABSTRACT

In a shifting device, wherein a shifting operation is effected by the engagement of a guide pin with a cam groove, which is delineated by a control face for guiding the guide pin, and a back-up face serving no guide pin guidance function. The guide pin is so constructed as to be normally maintained in engagement with the control face of the cam groove, so as to be shifted by engagement with the control face of the cam groove during the normal shifting operation. In the event that an undesired shock is imparted to the shifting device, the guide pin is adapted to impinge on the back-up face of the cam groove, rather than on the control face thereof, so that the engagement between the guide pin and the control face of the cam groove is maintained in an optimum condition, without being damaged due to such a shock, thus ensuring an accurate shifting operation of the shifting device.

14 Claims, 6 Drawing Figures

SHOCK ABSORBENT SHIFTING DEVICE

BACKGROUND OF THE INVENTION

The present invention relates generally to improvements in a longitudinally position adjusting or shifting device including a stationary member having a guide groove and at least one driven member having a guide pin engaging the guide groove, wherein in the event of an unwanted external force being exerted on the driven member, a smooth operation of the shifting device is ensured, and it relates more particularly to a shifting device for axially adjusting the positions of lenses mounted in a lens barrel.

Generally, whether a lens barrel is mounted on a camera body or remains separate from the camera body, such occasions often arise that the lens barrel undergoes mechanical shock due to its being dropped from a users hand or due to an inadvertent impingement on a hard object.

A shifting device for axially adjusting lenses mounted in a lens barrel, in general includes a guide pin and a guide cam groove receiving the guide pin, and the shifting or adjusting operation effected by the shifting device is accomplished by sliding the guide pin along the cam groove under the guidance of the latter.

Should any shock be exerted on such a lens barrel, the impingement of the guide pin on the control face of the cam groove results in a breakage or rupture of or damage to an element of the shifting device thereby disabling the device from accomplishing a subsequent shifting operation a smooth and accurate manner.

A known device, as shown in FIG. 1 by way of example, is a lens barrel for two-group type zoom lens includes a shifting device for a first movable lens which is alone described for the simplicity of explanation. Linear groove 3 and 11 extending in the direction of the optical axis of the lens, are formed at the internal face of a stationary sleeve 2 which is integrally formed with a barrel mount 1 for attaching the lens barrel to a camera body. A cam sleeve 8 is fitted in the stationary sleeve 2, and is slidingly rotatable position therein at a fixed longitudinal position on the axis. Cam sleeve 8 is provided with peripheral cam grooves 5 and 12. A connecting pin 20 carried by cam sleeve 8 extends radially outwards through an annular groove in stationary sleeve 2, and engages a recess 7 provided in the inside peripheral face of a zoom ring 6, whicn, in turn, engages the outer face of stationary sleeve 2 and is rotatable at a fixed position on the axis of the stationary sleeve.

A first movable lens frame 14 and a second movable lens frame 17 are slidably fitted in cam sleeve 8, and guide pins 4 and 9 respectively carried by frames 17 and 14 extend radially outwards through cam grooves 5 and 12 respectively in slidable engagement therewith, and also slidably engage in linear grooves 3 and 11.

Engaged with a screw thread or a helicoid provided on the inner wall of first movable lens frame 14 is a screw thread or helicoid 15 provided on the outer peripheral surface of a lens holding frame 16 carrying a first movable lens 19. Lens holding frame 16 is formed with a lens barrel front portion 13 and a focusing ring 10 loosely fitted on stationary sleeve 2 and integral with lens barrel front portion 13.

In operation of the adjusting mechanism, if focusing ring 10 is rotated, lens holding frame 16 carrying first movable lens 19 is shifted frontwards or rearwards by means of helicoid 15, thereby focusing the lens system.

If zoom ring 6 is rotated, then cam sleeve 8 is rotated by means of the pin 20, together with zoom ring 6, whereby follower or guide pins 4 and 9 are guided by cam grooves 5 and 12 as well as linear grooves 3 and 11, respectively, thereby shifting second movable lens frame 17 and first movable lens frame 14 in the axial direction at a predetermined ratio or rate relationship, respectively, whereby zooming is achieved.

In the event of a shock being applied to or exerted on lens-barrel front portion 13, such shock causes, for example, guide pin 9 and cam groove 12 to collide with each other, with a resultant breakage or rupture of or damage to one or both of these elements which disables the smooth and accurate operation of the zooming mechanism in the subsequent photography, and impairs the proper movement of the first movable lens frame 14. In the worst case, breakage of cam groove 12 results, disabling the rotation of the cam sleeve 8 and hence rotation of the zooming ring 6. In order to avoid the above-described drawbacks, an arrangement may be employed in which a protective lens barrel covering the outer periphery of the holding frame 16 for first movable lens 19 is mounted on the lens barrel against movement in the direction of the optical axis, and the front portion of the protective lens barrel assumes a position to project a considerable distance forward of the front portion of holding frame 16, when the latter is set to the front extremity by the focusing operation and the zooming operation, so that holding frame 16 will not project externally of the protective lens barrel.

Such an arrangement however, is accompanied by a resulting high complexity in the construction of the lens barrel, as well as in difficulty in design of the rotating focusing ring 10. Furthermore, in order to prevent light rays incident on the first movable lens 19 assuming a most retracted position, from being interrupted by the front portion of the protective lens barrel, the diameter of the protective lens barrel must be increased, resulting in an increased size of the overall lens barrel, and hence an awkward and bulky lens barrel.

SUMMARY OF THE INVENTION

It is a principal object of the present invention to provide an improved shifting device or longitudinal position adjusting mechanism including a stationary member having a cam or guide groove and a driven member having a follower or guide pin slidably engaging the guide groove, wherein in the event of a mechanical shock being imparted to the driven member in a predetermined direction thereof, the components of the shifting and guiding mechanism highly resists the shock and obviates any damage or rupture whereby the mechanism reliably continues to fully and accurately perform its shifting and guiding functions.

It is another object of the present invention to provide an improved shifting device, which is highly suitable as a mechanism for shifting lenses in a lens barrel of a camera and neither increases the complexity of the structure of the lens barrel or impairs the freedom of design of the lens barrel.

It is a further object of the present invention to provide an improved shock resistant shifting device, which is applicable for shifting lenses in a barrel of a camera, without increasing the overall size of the lens barrel.

DESCRIPTION OF THE PREFERRED EMBODIMENTS

Figure 1:
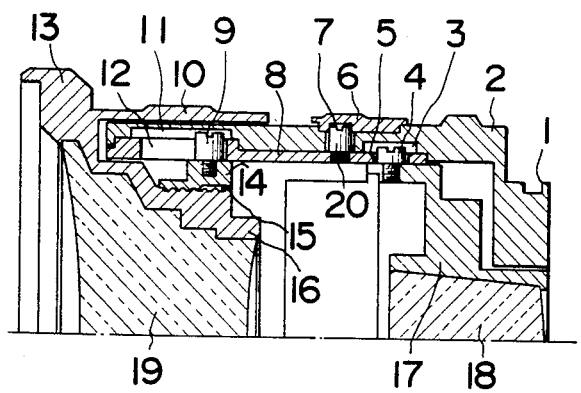
FIG. 1 is a cross sectional view of a prior art lens barrel in a two-group type zone lens.
Figure 2:
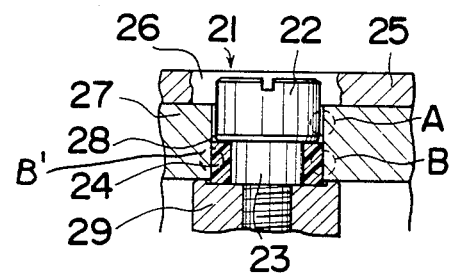
FIG. 2 is a cross sectional view of an essential part of a shifting device of one embodiment of the present invention.
Figure 3:
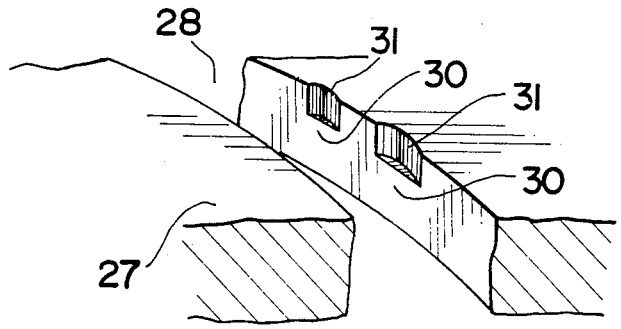
FIG. 3 is an enlarged fragmentary perspective view of the cam groove of the device shown in FIG. 2.

Referring now to FIGS. 2 and 3 of the drawings which illustrate a preferred embodiment of the present invention, a follower or guide pin 21 corresponding to the guide pin 9 shown in FIG. 1 extends through and slidably registers with a cam groove 28 corresponding to the cam groove 12 of FIG. 1, and slidably engages a linear groove 26 corresponding to the linear groove 11 of FIG. 1. In comparison of the components of the mechanism of FIG. 2 with those of the mechanism of FIG. 1, a stationary sleeve 25, a cam sleeve 27 and a first lens frame 29 of the former correspond to stationary sleeve 2, cam sleeve 8 and first lens frame 14 of the latter, respectively.

Guide pin 21 is of a stepped configuration and consists of a cylindrical portion 22 and a cylindrical neck portion 23, which differ in outer diameter from each other, as seen in FIG. 2. The outer diameter of head portion 22 is somewhat smaller than the width of cam groove 28, so that upon the ordinary shifting operation, head portion 22 and cam groove 28 are maintained out of contact with each other. On the other hand, neck portion 23 is rotatably engaged by or fittedly covered with a guide collar 24 made of a material having a proper hardness and elasticity, such as nylon or Delrin (registered Trade Mark). The outer diameter of the guide collar 24 is somewhat larger than that of head portion 22, but equal to the width of cam groove 28, so that the guide collar is fitted in cam groove 28 for engagement therewith.

If cam sleeve 27 is rotated by turning the zooming ring, then guide collar 24 of guide pin 21 which is guided along linear groove 26 by means of head portion 22 is shifted by the engagement with the control face of cam groove 28 in a portion B therebetween, whereby first movable lens frame 29 effects a shifting operation or axial movement commensurate to the zooming operation.

In the event that any abnormal shock, as described above, is imparted to or exerted on the lens barrel, such a shock is transmitted by way of neck portion 23 and guide collar 24 to contacting portion B. At this juncture, guide collar 24 deforms by virtue of its elasticity to absorb the shock, so that the control face of cam groove 28, with which guide collar 24 is in engagement, remains intact, with freedom from any rupture or breakage. Should guide collar 24 fail to completely absorb the shock, the remaining stress is transmitted to head portion 22 by way of the lower portion thereof, to cause head portion 22 to impinge on the back-up face of cam groove 28 at a portion of contact A therebetween. As a result, back-up face 30 of cam groove 28 may be indented as at 31 in FIG. 3 in the portion of contact A with head portion 22. This back-up face 30 however, does not engage head portion 22 in the ordinary shifting operation, and hence does not at all hinder any subsequent zooming operation.

In this embodiment, the overall peripheral surface B of guide collar 24 is brought into contact with the wall cam groove 28 for engagement therewith, at the ordinary shifting operation.

Figure 4:
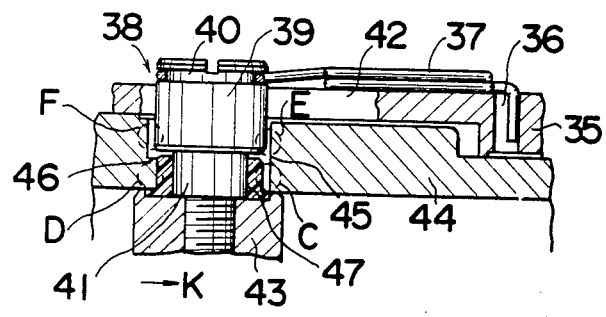
FIG. 4 is a cross sectional view of an essential part of a shifting device according to another embodiment of the invention.
Figure 5:
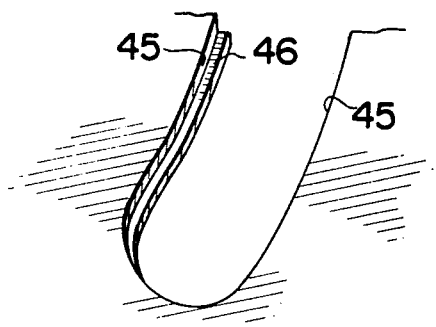
FIG. 5 is an enlarged fragmentary perspective view of the cam groove of the device of FIG. 4.

In a second embodiment of the present invention shown in FIGS. 4 and 5, a guide pin 38 consists of a cylindrical head portion 39 coaxially cylindrical and a neck portion 41 on which is rotatably fitted a resiliently deformable or elastic guide collar 47, of the nature of that in the first embodiment shown in FIG. 2. A cam groove 45 in a cam sleeve 44 has a stepped face or portion 46 as a control face with which guide collar 47 is brought into contact for engagement, and a follower or guide pin 38 is provided with a peripheral groove 40 in the upper border of head portion 39, about which groove is wound one end of a spring 37 which is attached at its other end to a stationary sleeve 35 by engaging a hole 36 therein so that the guide pin is biased in a direction to bring guide collar 47 into engagement with the stepped or small diameter or width portion 46 in the portion of contact D therebetween. The direction of bias of the guide pin is opposite to the direction of arrow K in which an impact or shock may be exerted or imparted on a first movable lens frame 43.

In this last described embodiment, the outer diameter of head portion 39 is somewhat larger than that of guide collar 47, but smaller than a maximum width of cam groove 45. The outer diameter of guide collar 47 is somewhat smaller than the width of the cam groove at the stepped portion 46.

In the ordinary zooming operation, guide pin 38 is maintained biased in a direction, in which guide collar 47 is in engagement with the inwardly offset or stepped portion 46 of cam groove 45 only in the area of contact D therebetween, and head portion 39 is guided along linear groove 42, whereby first movable lens frame 43 is shifted along the direction of the optical axis. Concurrently, the other or opposite portion C of guide collar 47 and peripheral portions E and F of head portion 39 are maintained out of contact with the faces of cam groove 45. Should any shock in the direction of arrow K be imparted to the first movable lens frame 43, guide pin 38 would be urged due to such a shock in the direction of arrow K against the force of spring 37, so that the peripheral portion E alone of head portion 39 is brought to impingement on the wall of cam groove 45, with other portions C, D and F remaining out of contact with the wall of cam groove 45. In the event that guide pin 38 and the face of cam groove 45 suffer rupture, distortion or breakage in the area of portions E thereof due to such a shock, the proper operation of the device is not adversely effected since these portion do not all contact each other for shifting the first movable lens frame 43 in the subsequent ordinary shifting operation. FIG. 5 is a fragmentary perspective view of the stepped portion 46 of cam groove 45 in the second embodiment.

Figure 6:
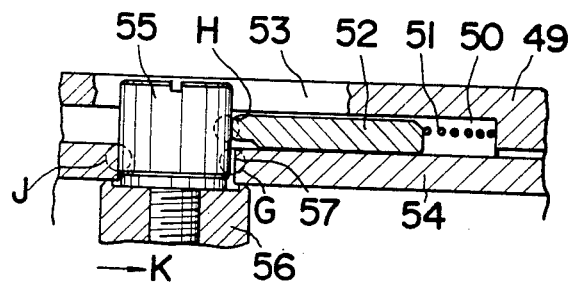
FIG. 6 is a cross sectional view of an essential part of a shifting device according to a further embodiment of the invention.

In a third embodiment of the present invention as shown in FIG. 6, a guide or follower pin 55 is of uniform cylindrical configuration, and has an outer diameter somewhat smaller than the width of a cam groove 57 formed in a sleeve 54. On the other hand, a stationary sleeve 49 is provided with a slot 50 in the direction of arrow K, in which direction a shock may be imparted. Provided in slot 50 is a resilient member 52 biased in a direction opposite to that of arrow K under the force of a compression spring 51, so that guide pin 55 is urged at a portion H by resilient member 52 in a direction opposite to the direction of arrow K, in which a shock may be imparted to first movable lens frame 56 carrying follower pin 55. Guide pin 55 is therefore maintained at a portion J alone in engagement with the contact face of a cam groove 57.

In the ordinary shifting operation, guide pin 55 is shifted by being guided along linear groove 53 and along the contact face J of cam groove 57. In the event of an abnormal impact or shock being applied, guide pin 55 is moved to the right against the force of spring 51, as a result of which a portion G impinges on the back-up face of cam groove 57. Even if guide pin 55 and the backup-face of cam groove 57 is broken or damaged in portions G, such does not hinder a subsequent ordinary shifting operation, because these portions remain out of contact with each other, upon ordinary shifting operation.

The embodiments of the present invention are described for mechanisms in which the shifting device of the invention is used in the lens barrel for two-group type zoom lens. The shifting device of the present invention may as well be used as a shifting device for a four-group zoom lens barrel, a one-ring type zoom lens barrel, a floating lens system and other focusing devices, or as a shifting device for other accessories. For example, if a cam for use in a macro-lens is provided in a cam portion, the shifting device of the present invention may be used for a macro-focusing lens barrel.

According to the present invention, a cam groove for guiding a driven member having a guide pin includes a control face for guiding the guide pin of the driven member and a back-up face having no relation to the guidance of such driven member, so that in the event of a shock being exerted on the driven members, such a shock will not be imparted to or exerted on the control face of the cam groove, but on the back-up face thereof. Such an arrangement therefore ensures a smooth and accurate shifting operation of the shifting device, even in the event of any abnormal shock being given thereto, and provides a greatly increased resistance to a shock acting on the shifting device.

I claim:

1. A shifting device in a lens barrel housing a lens system having an optical axis and including a front lens element at the forwardmost position on the object side of said lens system, comprising:
   a rotatable barrel having a guide groove delineated substantially parallel control and back-up faces;
   movable barrel means engaged in said rotatable barrel and movable along said optical axis, said movable barrel means holding said front lens element and including a front end barrel portion located at the frontmost position on the object side of said lens barrel; and
   follower means including a pin member carried on said movable barrel means and loosely engaging said guide groove and including a first portion and a second portion of greater diameter than said first portion and facing said control and back-up faces, and an elastic collar member of greater diameter than said second portion provided on said pin member first portion and having a peripheral surface which is in contact with said control face and back-up face so that a small space is provided between said second portion of said pin member and both of said guide groove faces.

2. A shifting device as set forth in claim 1, wherein said collar member is of approximately cylindrical shape and is rotatable about said first portion.

3. A shifting device as set forth in claim 2, wherein said first portion is located proximate the base portion of said pin member, and said second portion is proximate the top portion of said pin member.

4. A shifting device as set forth in claim 3, wherein said guide groove includes a cam groove, said rotatable barrel includes a cam barrel of a zoom lens barrel, said cam barrel being rotatable by an external zooming operation, and said movable barrel means includes a lens retaining member retaining an objective lens portion.

5. A shifting device as set forth in claim 4, further comprising;
   an outer barrel which is internally engaged by said cam barrel, said outer barrel being fixed against movement in any direction and having a linear guide groove extending along said optical axis, and wherein said objective lens portion includes an objective lens and a retaining barrel retaining said objective lens, said retaining barrel being in engagement with said lens retaining member by way of a helicoid and an outer end portion of said retaining barrel integrally includes a focusing operating portion which covers the front end portion of said outer barrel.

6. A shifting device for use in a lens barrel of a camera comprising:
   a barrel rotatable about a central longitudinal axis and having a guide groove delineated by parallel control and back-up faces;
   a movable barrel engaged in said rotatable barrel and movable along said axis;
   follower means loosely engaging said guide groove, said follower means including a pin member carried on said movable barrel and an approximately cylindrical elastic collar member rotatably carried by said pin member, said pin member including a first portion on which said collar member is located and a second portion having an outside diameter greater than the outside diameter of said collar member, and said control face including a contact face engagable by said collar member and a non-contact face outwardly offset from the plane including said contact face and spaced from said second portion; and
   means for biasing said follower means so that said elastic collar member is in contact with said control face.

7. A shifting device as set forth in claim 6, wherein said first portion is provided at a base portion of said pin member, and said second portion is provided at a top portion of said pin member.

8. A shifting device as set forth in claim 7, wherein said guide groove includes a cam groove, said rotatable barrel includes a cam barrel of a zoom lens barrel and is rotatable by an external zooming operation, and said movable barrel includes a lens retaining member retaining an objective lens portion.

9. A shifting device as set forth in claim 8 further comprising an outer barrel which is internally engaged by said cam barrel, said outer barrel being fixed against movement in any direction and having a linear guiding groove extending along the direction of said axis and an anchoring recess, said top portion of said pin member including an engaging portion engaging into said linear guiding groove, said biasing means including a spring having one end engaging said engaging portion and the other end engaging said recess whereby to resiliently maintain said collar member in contact with said contact face, and said objective lens portion including an objective lens and a retaining barrel retaining said objective lens, said retaining barrel being in engagement with said lens retaining member by way of a helicoid and the front end portion of said retaining barrel integrally including a focussing operating portion which covers the front end portion of said outer barrel.

10. A longitudinal position adjusting mechanism comprising an outer barrel having formed therein a guideway delineated by opposing parallel control and back-up faces, said control face being stepped and including relatively inwardly and outwardly offset portions, an inner barrel located in and longitudinally and rotatably movable relative to said outer barrel, a follower member carried by said inner barrel and registering with said guideway and spaced from said faces thereof and a resiliently deformable collar member carried by a portion of said follower member and leaving a portion thereof uncovered, and normally engaging said inwardly offset portion of said control face and being sufficiently resiliently deformable under a predetermined stress to permit the transverse movement of said follower member in said guideway into engagement with said back-up face, said follower member uncovered portion being spaced from the confronting face of said outwardly offset portion.

11. The mechanism of claim 10 wherein said follower member uncovered portion is longitudinally offset from said collar carrying portion and has a diameter less than the width of said guideway and the outside diameter of said collar.

12. The mechanism of claim 10 including biasing means resiliently urging said follower member toward said control face.

13. A shifting device for use in a lens barrel of a camera, comprising:
 a barrel rotatable about a central longitudinal axis and having a guide groove delineated by parallel control and back-up faces;
 shock receiving means provided at a longitudinally forwardmost position of the lens barrel;
 a movable barrel engaged in said rotatable barrel and movable along said axis, said movable barrel being interconnected to said shock receiving means so that any shock imparted to said shock receiving means is transmitted to said movable barrel;
 follower means loosely engaging said guide groove, said follower means including a pin member carried on said movable barrel and an elastic collar member carried by said pin member; and
 means for biasing said follower means so that said elastic collar member is in contact with said control face.

14. A shifting device as set forth in claim 13, wherein said collar member is of approximately cylindrical shape and is rotatable about said pin member.

* * * * *